Aug. 2, 1938.   P. SCHLUMBOHM   2,125,620
CONTAINER AND METHOD OF MAKING THE SAME FROM FOIL
Filed Oct. 19, 1935   2 Sheets-Sheet 2

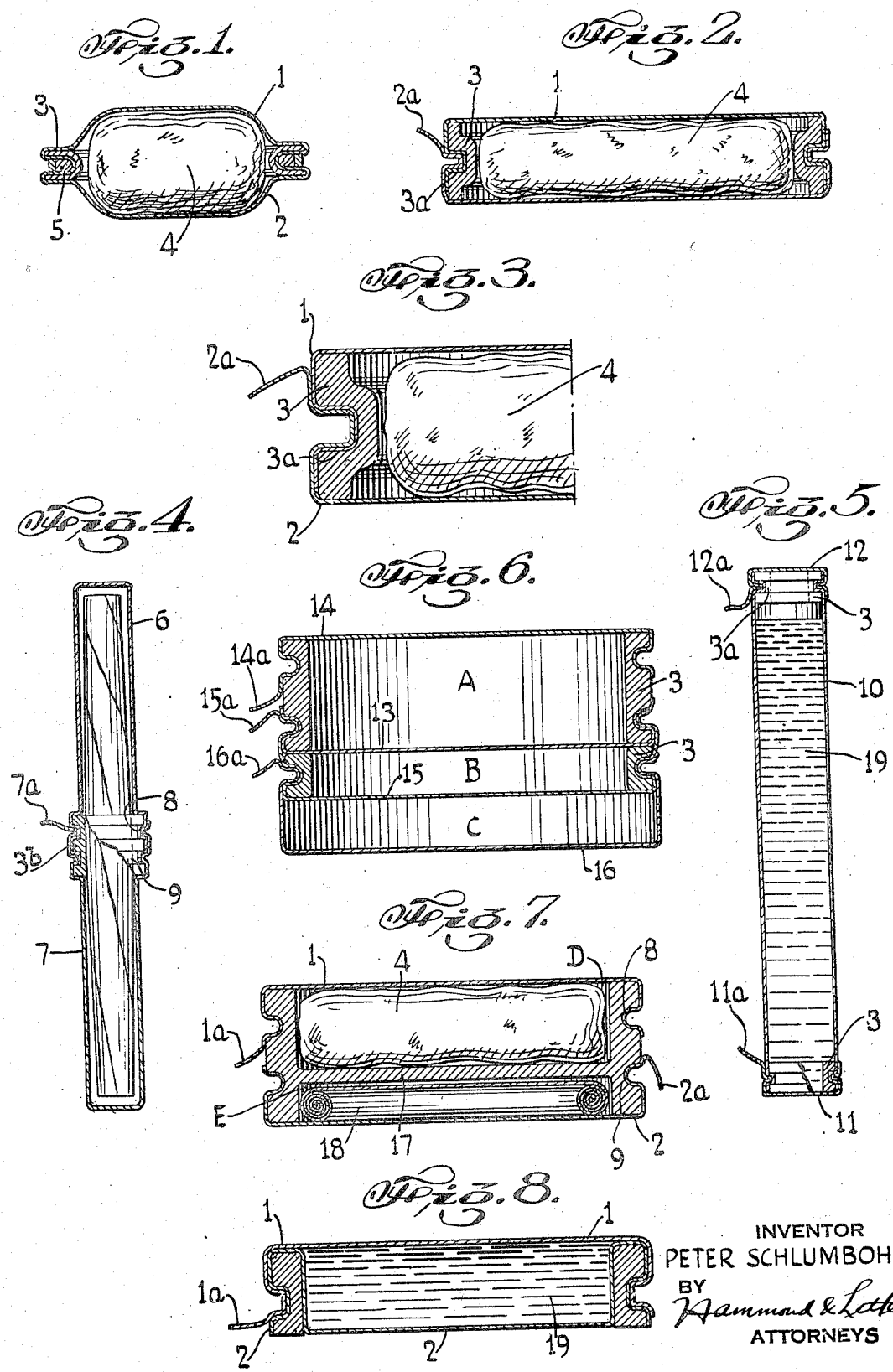

INVENTOR
PETER SCHLUMBOHM
BY Hammond & Littell
ATTORNEYS

Patented Aug. 2, 1938

2,125,620

UNITED STATES PATENT OFFICE 2,125,620

CONTAINER AND METHOD OF MAKING THE SAME FROM FOIL

Peter Schlumbohm, New York, N. Y.

Application October 19, 1935, Serial No. 45,737
In Germany April 24, 1935

16 Claims. (Cl. 29—148.2)

This invention relates to an air and water-tight package, the walls of which are composed of foils, and to a method of making the same, more particularly, the invention concerns an air and water-tight metal foil package made of aluminum foil.

Whereas organic foils, e. g. acetylcellulose foils, can be glued together and can thus make an airtight wrapping, this method cannot be applied to metal foils, as it would be extremely difficult to join the edges of two aluminum foils by soldering them together. There is at present no way of making a really air-tight package of aluminum foils.

The new foil package of metal foils, and especially of aluminum foils, created by the present invention, is air and water-tight and opens a new field for the appliance of metal foils and especially of aluminum foils.

In comparing the new package with the ordinary can container made from sheet metal, and with a pure foil wrapping, one might classify the new package as a semi-stiff package in contrast to a stiff can container or an unstiff foil wrapping. The semi-stiff character of the new package is created by combining unstiff foils with a stiff special body, which has one main feature: one or more grooves.

A principal feature of this invention consists in joining the edges of two metal foils by means of such a rigid grooved body. The invention is illustrated in the accompanying drawings, in which Figs. 1 to 11 show examples of containers made in accordance with the invention.

Fig. 1 and Fig. 2 illustrate a metal foil package which contains a pad or wad impregnated with liquid.

Fig. 3 is an enlargement of part of Fig. 2.

Fig. 4 illustrates a metal foil packing for a single cigar, or goods of similar shape.

Fig. 5 illustrates a tubular container made from metal foil.

Fig. 6 illustrates a foil package comprising several separated compartments, A, B, C.

Fig. 7 illustrates a metal foil package with two separated compartments, E and D.

Fig. 8 illustrates another form of metal foil package containing a liquid.

Figure 11:
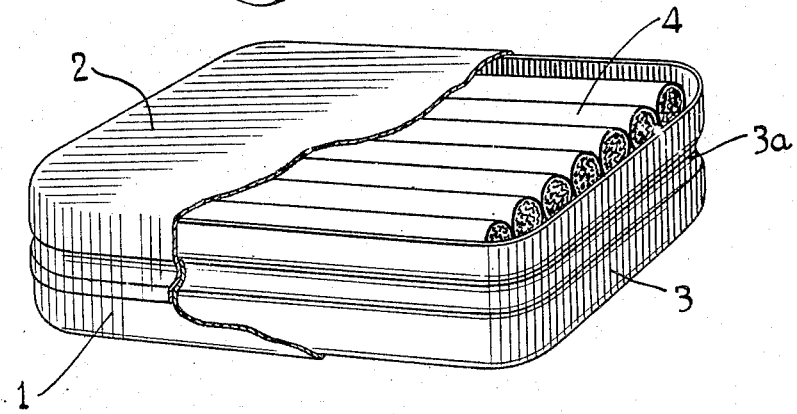
Figs. 9 to 11 illustrate the details of a hermetic foil container for cigarettes.

The metal foil packages illustrated in Figs. 1 and 2, are adapted particularly for packing moist materials, e. g. a moist cotton pad 4 between two metal foils 1 and 2.

In Fig. 1 and in Fig. 2, the two metal foils 1 and 2 are joined together at their edges by means of the groove 3a of a rigid annular body 3. The stiff body 3 may be an aluminum ring, e. g. of one millimeter thickness, spun from sheet metal, or made by any other technical process. The two models as illustrated in Figs. 1 and 2, illustrate different ways of joining the edges in the groove of the stiff ring. In Fig. 1, contrary to Fig. 2, the ring is not as broad as the height of the package. The edges of the foils 1 and 2 are bound around the border of the ring, not necessarily overlapping each other, and by means of a string 5 and an additional layer 5a of varnish, wax or the like, a complete, tight closure is obtained.

In the embodiment as illustrated in Fig. 2, the two metal foils 1 and 2 are applied in the form of two caps which fit over the ring 3. The edges of the cap foil 1 having been pressed into the groove 3a of the ring 3, and the moist cotton pad 4 having been filled in and placed inside the ring 3, the second metal foil cap 2 is placed over the ring 3 and its edges are also pressed into the groove 3a, where they overlap the edges of the foil cap 1. The foil cap 2 may be equipped with a tongue 2a by tearing of which the foil 2 is destroyed for the purpose of opening the package.

In Fig. 4, the two metal foil caps 6 and 7 are deep enough to correspond to about half of the total length of a cigar and the embodiment illustrated in Fig. 4 shows that in combination with the rigid ring 3 and its grooves 8 and 9, the two metal foil caps 6 and 7 can be sealed together to form an air-tight container for the cigar, which can be opened by tearing the tongue 7a.

In Fig. 5 I illustrate the construction of a "can" e. g. for containing beer, made from aluminum foil. The aluminum foil 10 is made in the form of a deeply punched tubular container, which shall hold the liquid 19. The edges of the foil 10 are joined hermetically together with the edges of the foil cap 12 in the groove 3a of the rigid ring 3. The container may be opened by tearing a tongue 12a for destroying the foil 12. If required, also the other end of the tubular container 10 may be joined with the edges of a metal foil cap 11 with tongue 11a by means of the grooved ring 3.

The embodiment illustrated in Fig. 6 combines one ring 3 with two grooves, and one ring 3 with one groove, for the purpose of joining several foils together and obtaining a package in which three separate packing compartments, A, B and C, are created by means of the four foils, 13, 14, 15 and 16. Foil 14 with tongue 14a, is fixed in the one groove of the rigid ring 3. The other groove of ring 3 joins the foil 13 and the foil 15, with tongue 15a. The metal foil cap 15 on the other hand contains another ring 3 in the groove of which the foil 16, equipped with tongue 16a, is fixed. It is obvious that compartment C can be opened by tearing tongue 16a, compartment B by tearing tongue 15a and compartment A by tearing tongue 14a. It is further obvious that additional compartments might be created if the foil 16 should contain an inside ring as illustrated for compartment B, etc.

Fig. 7 shows an embodiment in which the rigid grooved body has a partitioned wall 17 which together with metal foil 1 forms compartment D and which, together with metal foil 2, forms the compartment E. Metal foil 1 is fixed in the groove 8 and equipped with metal tongue 1a; metal foil cap 2 is equipped with metal tongue 2a and fixed in the groove 8. The advantage of having two separate compartments makes it possible to store within one foil package one liquid or moist packing goods 4 and one dry packing goods 18.

The embodiment illustrated in Fig. 7 would be especially suitable as a prophylactic hygienic equipment.

The embodiment illustrated in Fig. 8 shows the possibility of avoiding a direct contact between the content of the foil package and the rigid ring 3. The metal foil cap 2 has a diameter which corresponds only to the inside diameter of the grooved ring 3. The border of the cap is then folded backwards over the outside surface of the grooved ring 3 and is fixed in its groove 3a. After the liquid 19 has been filled in, a metal foil cap 1 is shoved over the ring 3 and the edges of the foil cap are also squeezed into the groove 3a, overlapping the edges of foil 2. By means of a tongue 1a the foil 1 may be torn for opening the container.

It is obvious that the inside wall of the rigid ring 3 mechanically supports the foil wall 2 in a very convenient manner.

Fig. 3 is an enlargement of a part of Fig. 2 and has been enlarged for the purpose of showing one important constructional feature: the stiff grooved ring 3 preferably has edges which form an angle of about 45° with the outside wall of the ring instead of having a sharp 90° edge. It has been found that this constructional feature adds much to the creation of a tight closure. Besides, the metal foil caps are not cut, as they would be by a 90° edge upon attaching the foil cap 1, 2 to the ring 3 under pressure.

The practical result obtained by the invention is an air- and water-tight container made from metal foil. It has been found that the embodiment illustrated in Fig. 2 is even capable of keeping such volatile liquids as pure alcohol, without any tightening substance being required in addition to the foils 1 and 2 and the grooved ring 3.

I have found aluminum foil of 0.1 millimeter most suitable for metal foil containers in which no inside pressure is foreseen, and aluminum foil of 0.15 millimeter to 0.2 millimeter for containers in which an inside pressure is existent, e. g. for beer and sparkling beverages.

To be most suitable for the purpose of the present invention, such aluminum foil should be pre-formed in order to obtain a smooth, foldless, even surface at those edges of the foil which are squeezed into the groove 3a of the rigid ring 3. This means that in order to obtain a container as illustrated in Fig. 2, the two metal foils 1 and 2 should not be ordinary foil sheets, the edges of which would be bent down when placed over ring 3, forming many folds, but should be preformed in the form of a cap. This cap may be punched from aluminum foil in such a way that the edges of the foil are bent over to form the cylindrical walls of the cap, the inside diameter of this cylinder being only slightly larger than the outside diameter of the ring 3. The length of the cylindrical walls of the foil cap corresponds to the breadth of the ring 3.

When making the embodiment illustrated in Figs. 2 and 3, I prefer to apply two metal caps 1 and 2 which differ slightly in the diameters of their cylindrical parts. It is obvious from Fig. 3 that the metal cap 2 should have a wider diameter than the metal cap 1, and if foils of 0.1 mm. are applied, the diameter of metal cap 2 should be 0.2 mm. greater than the diameter of metal foil cap 1. As a general rule, the diameter of the outside cap should be that amount wider which corresponds to twice the thickness of the foil applied.

After the metal caps 1 and 2 have been shoved over the ring 3, the sealing is effected by squeezing parts of the cylindrical walls of the metal caps into the groove 3a. This can be effected by known means, e. g., by a thick rubber ring which is placed around the container and upon which pressure is applied. The part of the rubber in giving way to that pressure, then squeezes the metal foils into the groove 3a.

In preforming the metal foils, a great variety is possible as far as shape is concerned, and the embodiments illustrated in the drawings, give an idea of this possible variety. Of special interest is an embodiment which is not illustrated in the drawings, but which can easily be visualized on the basis of Fig. 4: a container made from two metal foils which have been preformed in the form of hemispherical shells. If these two hemisphere shells are joined by means of a rigid ring in the way the caps 6 and 7 are joined, in Fig. 4, the container has the appearance of a ball. This embodiment is of special value (for well known physical reasons) for the purpose of sustaining great inside pressure.

Not only may the shape of the metal foil caps be varied greatly in connection with a round rigid grooved body, but also this rigid grooved body may have other forms than those of a round ring. By way of example, in Figs. 9 to 11, a rectangular package for cigarettes is shown.

Figure 10:
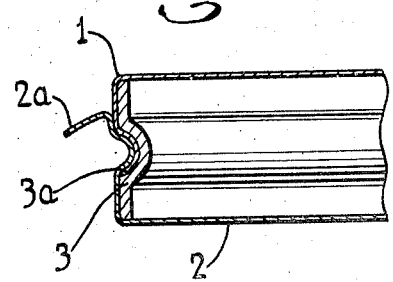
Figure 9:
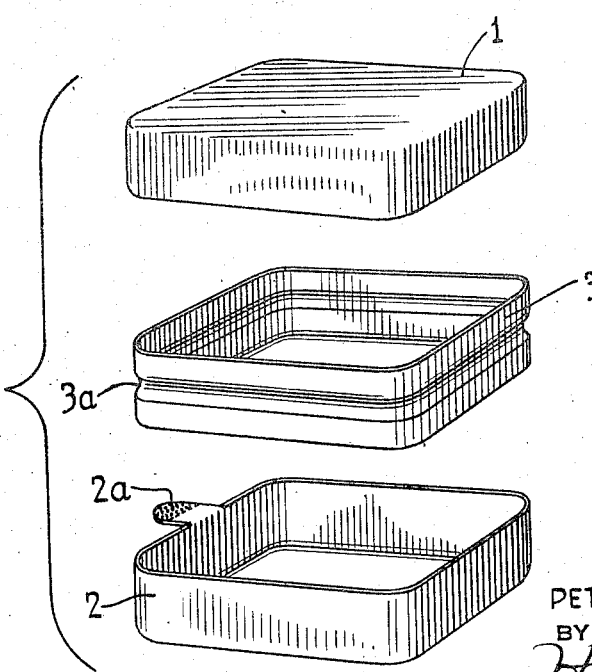

Fig. 9 shows the three components of the container, the rectangular foil cap 1, the rectangular foil cap 2, with tongue 2a and, the rectangular grooved, rigid body 3 with a groove 3a. The dimensions of the foil cap 2 are slightly wider than the dimensions of the foil cap 1, which has been explained above. After having shoved the foil cap 1 over the rigid body 3, and after having filled in the packing goods, foil cap 2 is shoved over foil cap 1 and the edges of both caps are squeezed into the groove 3a of the rigid body 3 as illustrated in Fig. 10, which is in analogy of Fig. 3.

Fig. 11 illustrates the complete container filled with the packing goods 4, in this case cigarettes, the container being shown partly opened.

However, such rectangular forms are not ideal for the purpose of the present invention and I prefer round or at least oval forms for the rigid body 3 in order to assure a tight seal at the entire circumference of the groove 3a.

In carrying out the invention, I can use equipment which has been developed for other purposes in the industry, especially machines for closing bottles by means of metal caps would be suitable with slight alterations for the new purpose of making containers from metal foil. As those machines of the bottling industry are highly developed automatic machines, e. g. capable of stamping metal caps from foil ribbon with a capacity of 6,000 per hour, I can benefit from the economy of those mass production machines in turning out the new foil containers in mass production at very low cost. On the other hand, I am opening a new field for the manufacturers of bottling machines by the new possibility of making containers out of metal foil caps by means of their machines.

One especially practical alteration of such metal cap stamping automats I might mention. These automats stamp metal foil caps from aluminum foil ribbon and are built as double stamping machines, meaning that with one punch two metal foil caps are stamped out of the ribbon.

For the purpose of the bottling industry, these metal caps are of course fully identical in their dimensions (their dimensions are limited to the dimensions of the bottle necks). Each of them is equipped with a tongue for tearing the metal foil cap later on. For the new purpose of making a metal foil container, e. g. as illustrated in Fig. 2, it would be economical to let the double press machine stamp out with one punch one metal cap 1 without a tongue, and one metal cap 2 with a tongue 2a and to provide, as mentioned above, a wider diameter for the metal cap 2 than for metal cap 1 (the difference of the two diameters being twice the thickness of the metal foil). Each pair of such metal caps could then, in combination with the rigid grooved ring 3 form the metal foil container.

It is obvious that in special cases of extreme conditions, high inside pressure, e. g., I could complete my metal foil container by a layer of cork between the foil cap and the rigid grooved body 3 in analogy to the cork plate which is used in the bottling industry inside of the metal cap. However, for the majority of the appliances of the new containers, these additional means of creating an hermetic seal will not be required.

In choosing the material for the rigid body 3, I am not limited to aluminum. Pressed glass and other materials also could be used.

Having now described the nature of my invention, and disclosed by way of example, various manners in which it is to be performed,

What I claim is:

1. The method of making an air and watertight container from metal foil, by joining a rigid, grooved ring and two aluminum foil caps, the edges of which have cylindrical shape and the diameter of which corresponds to the diameter of the rigid, grooved ring, which comprises placing said caps respectively over opposite sides of the ring and deforming the margins of the caps into a groove of the ring to provide a sealed joint.

2. The method of making an air and water tight container from metal foil which comprises forming the foil which forms a wall of the container over an exteriorly grooved peripheral rigid frame which is capable of resisting foil deforming pressures and which becomes a part of the finished container, deforming the foil over a peripheral edge of the frame to form an air and water tight seal and further deforming the foil into an exterior groove to lock the parts together.

3. The method of making an air and water tight container from metal foil which comprises shaping two metal foil sheets which form the container walls from opposite sides over a sustaining peripherally grooved rigid frame capable of resisting all of the operating pressures and deforming portions of the foil of both sheets into a common groove in the frame to lock and seal the parts together.

4. The method of making an air and water tight container comprising metal foil which includes forming the foil which forms a wall of the container over a rigid peripheral frame which is capable of resisting foil deforming pressures and which becomes a part of the finished container, and deforming the foil over a peripheral edge of the frame to form a securing connection.

5. The method of making an air and water tight container from metal foil which comprises applying two metal foil cup-shaped elements over a grooved peripheral frame capable of resisting foil deforming pressures and deforming the foil of both elements into one groove of said frame in superposed relation to secure the foil and frame together.

6. An air and water tight container comprising a peripheral frame having a peripheral outwardly presented groove, a pair of cup-shaped metal foil members telescoped over said frame and deformed into said groove in sealing contact with each other and with the frame, the frame being capable of resisting the pressure of the deforming of said members and, together with the foil sealed thereto, imparting sufficient rigidity to the container.

7. A container as defined in claim 6 characterized by the provision of a tearing tab projecting from one edge of the metal foil.

8. A multiple compartment water and air tight container having separable sections, comprising a plurality of peripheral frames having exterior peripheral grooves and a plurality of cup-shaped metal foil members telescoping over said frames and holding the same together, portions of said foil members being deformed into said grooves to form sealing and securing joints, the frames being capable of resisting the pressures of the deforming of the foil members and, together with the foil sealed thereto, imparting sufficient rigidity to the container.

9. An air and water tight container comprising a rigid peripheral frame bevelled exteriorly to provide obtuse angled outwardly presented sealing edges and having a central peripheral groove, a pair of cup-shaped metal foil members telescoped over said frame from opposite ends and deformed into said groove and thereby secured to said frame, said foil members forming seals with said obtuse angled edges and said frame being capable of resisting the pressure of deforming said foil members.

10. An air and water tight container comprising a rigid frame and a wall of metal foil including a portion telescoped over said frame and deformed inwardly over a peripheral edge thereof to form a seal and a securing connection therewith, said frame being capable of resisting the pressure necessary to deform the foil over the edge.

11. An air and water tight container comprising a peripheral frame presenting an obtuse angled peripheral edge and a wall of metal foil including a portion telescoped over said frame and forming a seal with said edge and deformed over another peripheral edge of said frame to secure the frame and foil together, the frame being capable of resisting the pressure of the deforming of said foil.

12. The method of making an air and water tight container from metal foil which comprises spanning pieces of foil which forms walls of the container over a grooved frame-like rigid body and pressing and deforming the foil overlying grooved portions of said body into the groove so as to adapt the deformed foil to the shape of the groove and thereby to seal and secure the foil to said body and render the container sufficiently rigid for use.

13. The method of making a container from pliable semi-rigid foil which comprises forming a hollow body of the foil, spanning walls of said body over a rigid grooved frame, pressing foil overlying grooved portions of the frame into the groove and deforming the foil to adapt it to the shape of the groove so as to fit the foil tightly over edges of said frame and to form a sealed connection between the foil and frame which renders the container sufficiently rigid for use.

14. A container comprising a tubular wall of metal foil and a pair of rigid tubular frame members capable of resisting foil deforming pressures, one inside of said wall adjacent each end thereof, each of said frame members including a peripheral outwardly facing groove, foil adjacent the groove in each member being deformed into the groove and adapted to the shape thereof whereby to provide a seal and secure connection between said wall and said frame members.

15. A container comprising a tubular wall of metal foil and a pair of rigid tubular frame members capable of resisting foil deforming pressures, one inside of said wall adjacent each end thereof, each of said frame members including a peripheral outwardly facing groove, foil adjacent the groove in each member being deformed into the groove, and adapted to the shape thereof whereby to provide a seal and secure connection between said wall and said frame members and a metal foil cap fitted over an end portion of said wall and over the corresponding frame member and including foil deformed into a peripheral groove in the corresponding frame member as aforesaid.

16. A container as defined in claim 15, said cap having a tearing tab projecting from one edge thereof.

PETER SCHLUMBOHM.